INVENTOR.
JOHN C. VOGTLE
BY Peter J. Patane
HIS ATTORNEY.

INVENTOR.
JOHN C. VOGTLE
BY Peter J. Patane
HIS ATTORNEY

Jan. 18, 1966    J. C. VOGTLE    3,229,934
CONTROL SYSTEM FOR AIRPLANES USING WEIGHTS
FOR AUTOMATIC STABILIZATION
Filed Oct. 4, 1963    3 Sheets-Sheet 3

INVENTOR.
JOHN C. VOGTLE
BY
*Peter J. Patane*
HIS ATTORNEY.

3,229,934
CONTROL SYSTEM FOR AIRPLANES USING
WEIGHTS FOR AUTOMATIC STABILIZATION
John C. Vogtle, Exton, Pa., assignor to Vogtle Aircraft
  Corporation, Exton, Pa., a corporation of Pennsylvania
Filed Oct. 4, 1963, Ser. No. 313,869
10 Claims. (Cl. 244—80)

This invention relates to control systems for airplanes and is a continuation-in-part of my application Serial No. 157,305, filed December 1, 1961, and now abandoned.

It is an object of the invention to provide in a control system an arrangement of weights for automatically stabilizing the airplane during translatory flight, the arrangement being such as to be adapted to be added to conventional airplanes, whereby a properly designed airplane's inherent tendency to automatically return to the stable attitude, after normal disturbances therefrom, is increased.

The normal motions of an airplane in flight are, firstly, translational motions and, secondly, rotational motions about its center of gravity. This invention is concerned with correcting the undesired rotational acceleration motions, i.e., pitch, roll and yaw motions, of the airplane and is hereinafter described as incorporated in a pitch control system and a roll control system.

In an airplane which ideally incorporates my invention, after the airplane reaches the desired altitude, the pilot adjusts the angle of trim of the control surfaces to achieve the desired attitude for translatory flight and thereafter the pilot may release the airplane's control system from his manual control because the airplane will automatically stabilize itself, i.e., be returned to the desired attitude, when disturbed from the desired attitude by normal disturbances, i.e., gusts and the like which cause the airplane to pitch or roll. However, during take-off, ascent, descent, turning or other intentional maneuvering of the airplane, the airplane is controlled by the pilot in the normal way and not by the stabilization arrangement of this invention. In a given airplane, depending on the friction in the control system and the magnitude and type of disturbance, the airplane will be either completely or partly returned to the desired attitude.

It is another object of this invention to arrange and position the weights used, relative to each other, so that they actuate the control surfaces in response only to rotational acceleration motions of the airplane and not to translational motions thereof and to position them so that they simultaneously sense and actuate the control surfaces, whereby there is no time lag due to intermediate devices (such as are used in some other control systems) between the sensing of the pitching or rolling and the corrective movement of the control surfaces.

In one embodiment of my invention I use stabilizing weights attached to the control surfaces forward of the hinge line of the control surfaces, of such a mass and interconnected in such a manner as to sense the disturbance of the airplane and to simultaneously, automatically and correctly activate the control surfaces in response to the airplane's rotational acceleration forces, but not the translational forces on the airplane and the stabilizing weights, the weights being sufficiently spaced from each other so that they are not excessively large.

Referring to the elevator control system, when a pitching motion takes place, as the displacement of the airplane increases, the elevators are continuously and increasingly pivotally displaced continuously producing a force resulting in a restoring moment which moves the airplane toward the stable attitude, and as the airplane returns to the stable attitude, the displacement of the elevators is continuously automatically reduced until there is no displacement from the neutral trim of the elevators and, therefore, a minimum amount of cycling takes place.

The stabilizing weights which I provide are of a size and placed to have moment arms sufficient to automatically move the control surfaces to a position resulting in a restoring moment on the airplane (due to the displacement of the control surfaces by operation of the control system) of a size and direction sufficient to move the airplane toward the stable attitude.

The foregoing and other objects, the principles and characteristic features of my invention, and the best modes in which I have contemplated applying such principles will further appear from the following description and the accompanying drawings in illustration thereof.

Figure 1:
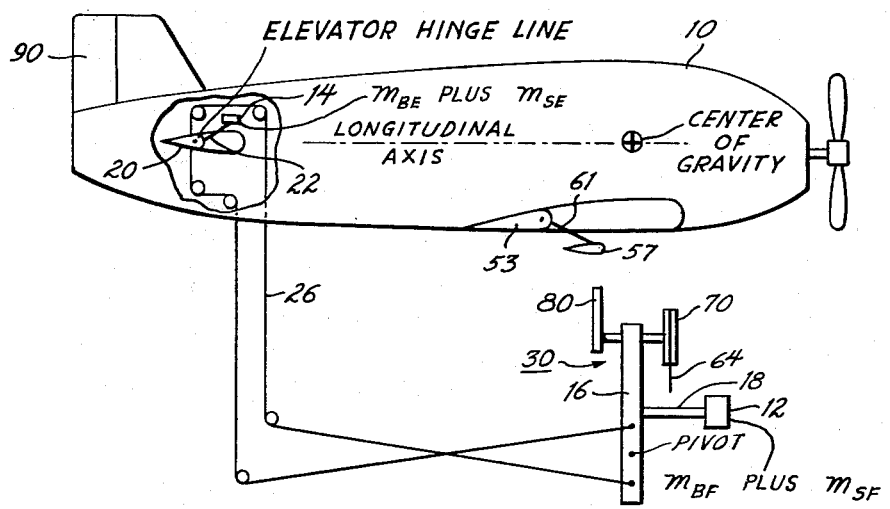
FIG. 1 is a diagrammatic view of an airplane embodying my invention as applied to the elevator control system.

Referring to FIG. 1 of the drawings, there is illustrated diagrammatically an elevator control system incorporated in an airplane for stabilizing the pitching motions of the airplane. Pitching motions of the airplane, i.e., angular acceleration motions about a lateral axis through the center of gravity, are caused by gusts of wind or other disturbances. At such times, depending on the direction of the gust, the airplane will either nose-up or nose-down.

The angular motion of the airplane 10 about the lateral axis is sensed by a forward weight 12 and two aft weights 14 and 15, equally spaced from the longitudinal axis through the airplane's center of gravity. The forward weight 12 is illustrated as connected to the pivotal control stick 16 so that the weight 12 is positioned forward of the pivotal axis of the control stick, the stick 16 carrying a shaft which rotatably supports a control wheel 80, the stick 16 and wheel 80 jointly defining a control member 30 for the elevators 20 and 21 and the ailerons 52 and 53. The aft weight 14 is connected to the elevator 20 by an arm 22 and the aft weight 15 is connected to the elevator 21 by an arm 23, the weights 14 and 15 being connected to the elevators so as to be positioned forward of the pivotal axis of the elevator.

The weights 14 and 15 each comprise two parts, a part $m_{BE}$ of each is a mass for static balance of the elevators and another part $m_{SE}$ of each is a mass for stability to automatically sense the disturbance of the airplane from the desired attitude and actuate the elevators. Likewise, the forward weight 12 comprises a part $m_{BF}$ for static balance of the control stitck and another part $m_{SF}$ sufficient to impose a moment on the cables of the system which balances the moment imposed thereon by the elevator weights $m_{SE}$.

Figure 2:
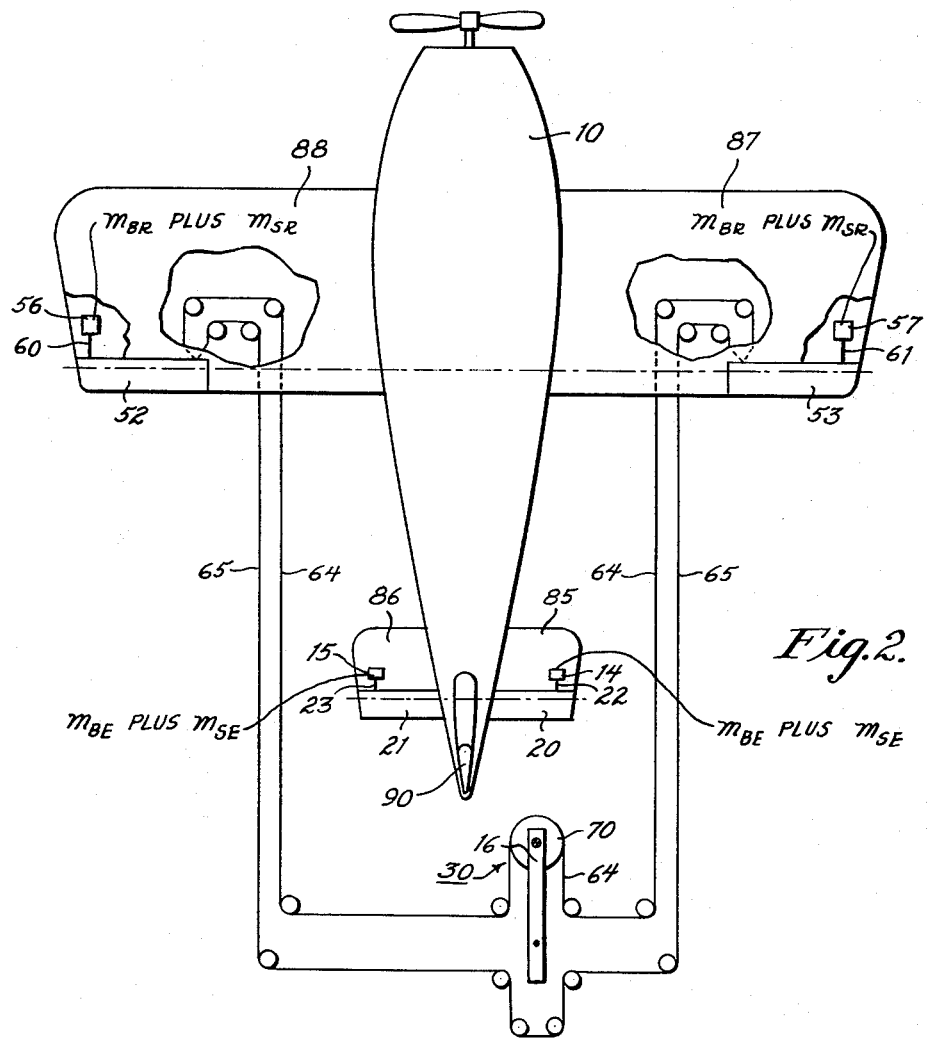
FIG. 2 is a diagrammatic view of the airplane embodying my invention as applied to the aileron system.

I first statically balance the elevator control system assuming the longitudinal axis of the airplane to be horizontal. That is, I calculate a weight $m_{BE}$ which when added one to each elevator at sufficient, practical moment arms will statically balance the elevators about the hinge line or pivotal axis. As a practical matter, on an actual airplane, I disconnected the cables from the elevators and I added weights to the elevators at a sufficient, practical moment arm so that the elevators (disconnected from the cables) when manually pivoted to another position remained in the latter position. To the weight $m_{BE}$ for FIG. 2 illustrates my invention applied to a roll con-
each elevator is added the hereinbefore mentioned weight
$m_{SE}$ for automatic stabilization, the weights $m_{SE}$ being
calculated as hereinafter described in detail.

I then calculate a weight $m_{BF}$ at a moment arm which
when added to the control stick will statically balance the
control stick and an additional mass $m_{SF}$ at the same mo-
ment arm which will statically balance the entire elevator
control system, i.e., the control system now including the
weights $m_{BE}$ and $m_{SE}$ at the elevators. As a practical
matter, in an actual airplane, after the weights 14 and 15
were added to the elevators, with the longitudinal axis of
the airplane horizontal and the elevators in line with the
stabilizers, I reconnected the cables to the elevators and
I added a sufficient weight 12 to the control stick at a suffi-
cient, practical moment arm so as to statically balance the
control system. That is, one could therafter, for instance,
manually pivot the elevators to another position (which
also simultaneously moved the control stick because of
the connecting cables) and the elevators and control
stick remained in the position to which they had been
moved.

The weights $m_{SE}$ to make the elevators move auto-
matically in the direction needed to stabilize the airplane
are calculated by determining a weight $m'_{SE}$ (according
to the equation which is hereinafter stated and which is
derived as follows). One half of $m'_{SE}$ is the mass $m_{SE}$
which is then added to the mass $m_{BE}$ at each elevator, re-
sulting in the total weights 14 and 15.

Figure 4:
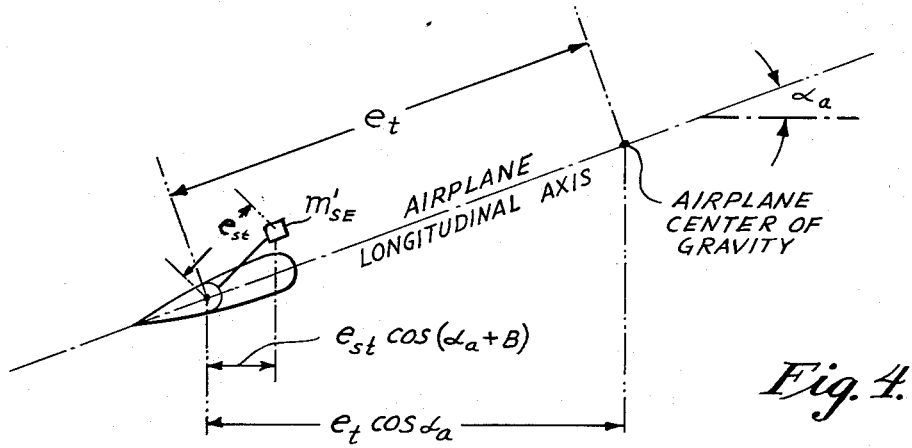
FIG. 4 is a diagram of an elevator and its weight related to the longitudinal axis of the airplane when the attitude of the airplane is at an angle with the horizon.
Figure 5:
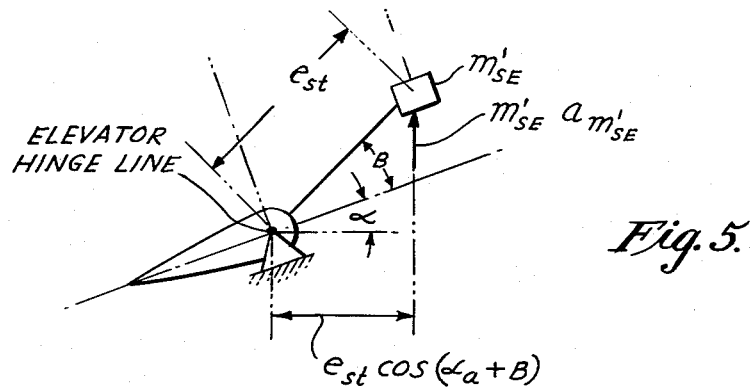
FIG. 5 is a diagram of an elevator and its weight considering it as a free body.

Taking the two elevators out of the system and consid-
ering them as one and as free bodies, referring to FIGS.
4 and 5, and writing the equation for the angular mo-
ment about the hinge line of the elevators we see that $$M_p = I_p \ddot{\alpha}_c$$

where $M_p$ = torque about the elevators' hinge line needed to
move the elevators in the direction necessary to sta-
bilize the airplane,
$I_p$ = the effective mass moment of inertia of all the moving
parts of the control system including the two weights
$m_{BE}$ required for static balance (but not including the
two weights $m_{SE}$ needed for stabilization) taken about
the elevator hinge line, and
$\ddot{\alpha}_c$ = the angular acceleration of the elevators needed to
move the elevators in the direction necessary to stabilize
the airplane.

Referring to FIG. 5, where the two elevators are con-
sidered as one and the two masses $m_{SE}$ have been com-
bined into one mass $m'_{SE}$ if the mass $m'_{SE}$ is disposed at
a moment arm $e_{st}$ measured parallel to the longitudinal
axis through the center of gravity of the airplane, see
FIG. 4, and if the elevator hinge line is at a distance $e_t$
from the center of gravity, since the force acting at the
weight is the product of its mass $m'_{SE}$ multiplied by its net
linear acceleration $a_{m'_{SE}}$ and since the latter is the prod-
uct of airplane's angular acceleration $\ddot{\alpha}_a$ times the hori-
zontal distance between the elevator hinge line to the air-
plane's center of gravity ($e_t \cos \alpha_a$) minus the elevator
acceleration $\ddot{\alpha}_c$ times the horizontal distance to the ele-
vator hinge line ($e_{st} \cos [\alpha_a + B]$) mathematically we can
write the following equations:

$$a_{m'_{SE}} = (e_t \cos \alpha_a)\ddot{\alpha}_a - (e_{st} \cos [\alpha_a + B])\ddot{\alpha}_c$$

and $$M_p = e_{st} \cos (\alpha_a + B) m'_{SE}[(e_t \cos \alpha_a)\ddot{\alpha}_a - (e_{st} \cos [\alpha_a + B])\ddot{\alpha}_c]$$

by substituting the above two last mentioned equations
in the equation $M_p = I_p \ddot{\alpha}_c$ we see that:

$$e_{st} \cos (\alpha_a + B) m'_{SE}[(e_t \cos \alpha_a)\ddot{\alpha}_a - (e_{st} \cos [\alpha_a + B])\ddot{\alpha}_c] = I_p \ddot{\alpha}_c$$

or $$\frac{\ddot{\alpha}_c}{\ddot{\alpha}_a} = \frac{e_{st}e_t [\cos (\alpha_a + B)]^2 m'_{SE}}{I_p + e^2_{st}(\cos [\alpha_a + B])^2 m'_{SE}}$$

assuming that the term $e^2_{st}(\cos [\alpha_a + B])^2 m'_{SE}$ is negli-
gible as is also the factor $(\cos [\alpha_a + B])$ since $m'_{SE}$ is
small relative to $I_p$ and the cosines are close to 1, I sim-
plify the foregoing equation to $$\frac{\ddot{\alpha}_c}{\ddot{\alpha}_a} = \frac{e_{st}e_t m'_{SE}}{I_p}$$

The immediately above stated equation shall herein-
after be referred to as my "basic" equation.

I have further discovered that to achieve stabilization
of the airplane, the value of $\ddot{\alpha}_c$ over $\ddot{\alpha}_a$ must be greater
than one. That is, if the value of these two terms is
equal to one, the elevators are moving at the same rate
of acceleration as the airplane providing no additional
stabilizing or destabilizing effect on the airplane, if they
are at a value of less than one the elevator movement is
lagging behind the airplane movement which would have
a destabilizing influence on the airplane, and it is only
when this ratio is greater than one that the elevator tends
to impose a moment on the airplane tending to turn it
toward its stable attitude, because it has moved at a faster
rate than the airplane to a position where it can create
a force which results in a stabilizing moment of the air-
plane.

A convenient value for this ratio of $\ddot{\alpha}_c$ to $\ddot{\alpha}_a$ has been
found to be 1.25. Therefore, since all the other terms
are known, one can then solve the basic equation for the
size of the weight $m'_{SE}$ which must be added for stability
at a desired moment arm $e_{st}$.

One half of the stability weight $m'_{SE}$ calculated is then
added to each of the two weights $m_{BE}$ for static balance
(previously determined) and the sum of the two, i.e., $m_{BE}$
plus one half of $m'_{SE}$, is added to each elevator at the
moment arm $e_{st}$.

Since the weights 12, 14 and 15 and their moment arms
are arranged so that static balance of the elevator con-
trol system is achieved when the longitudinal axis of the
airplane is horizontal, when the attitude of the airplane
changes to a nose-up or nose-down attitude, the elevator
control system is no longer statically balanced. That is,
at such time, the horizontal dimensions from the lines of
action of the gravity forces on the weights to the pivot
axes about which the weights move will either shorten
or lengthen. The moment thus imposed at the normal
attitude for translational flight is insufficient to actuate
the system since the angle of the normal attitude from
the horizontal is small. However, during pitching mo-
tions this moment may become substantial.

To insure that a net moment due the forces of gravity
on the weights 12, 14 and 15 will always be exerted on
the elevators tending to turn them in the direction neces-
sary for returning the airplane to the stable attitude, I
initially choose the moment arms of the weights and po-
sition them vertically relative to their pivot axes so that
in the tail-up attitude the horizontal moment arm of
the elevator weights 14 and 15 is larger than that of the
forward weight 12 and in the tail-down attitude the
horizontal moment arm of the forward weight 12 is larger
than that of the elevator weights 14 and 15. In the em-
bodiment illustrated in FIG. 1, this is achieved by posi-
tioning the weights 14 and 15 above the elevator hinge
line (as well as forward thereof) and by also positioning
the weight 12 above the pivotal axis of the control stick
16 but proportioning the length of the moment arms 18,
22, and 23 and choosing the angles at which they extend
from the elevators or the control stick so as to achieve
the net moment specified above when the longitudinal
axis is not horizontal.

trol system for controlling the ailerons 52 and 53. Each of the ailerons 52 and 53 is provided with a weight 56 and 57, respectively, connected directly thereto by moment arms 60 and 61, respectively. The weights 56 and 57 are carried by the moment arms 60 and 61 forward of the hinge line of the ailerons 52 and 53 and below thereof, as illustrated in FIGS. 1 and 2. Cables 64 and 65 interconnect the ailerons 52 and 53 and one of the cables 64 is formed in part by a chain (not illustrated in detail) which engages sprockets (not illustrated) carried by an inertia wheel 70 rotatably mounted on a shaft carried by the control stick 16, rotation of the inertia wheel 70 and, hence, movement of the cables 64 and 65 being controlled by the manual wheel 80. Suitable pulleys are provided for maintaining the chain biased into an engagement with the sprockets as the manual wheel 80 is turned. The weight 12, used in the pitch control system heretofore described and the wheel 80 are not illustrated in FIG. 2 for simplification purposes only.

The weights 56 and 57 each comprise two parts, one part of each weight $m_{BR}$ being the part needed to dynamically balance the aileron about its hinge line and an additional part $m_{SR}$ being the part needed for stability. I define dynamic balance as the condition where if the control surface, i.e., an elevator or an aileron, is considered as a free body, the dynamic disturbing forces acting about the longitudinal axis of the airplane and at the same time acting on the control surface will result in no control surface movement about the control surface hinge line.

Figure 6:
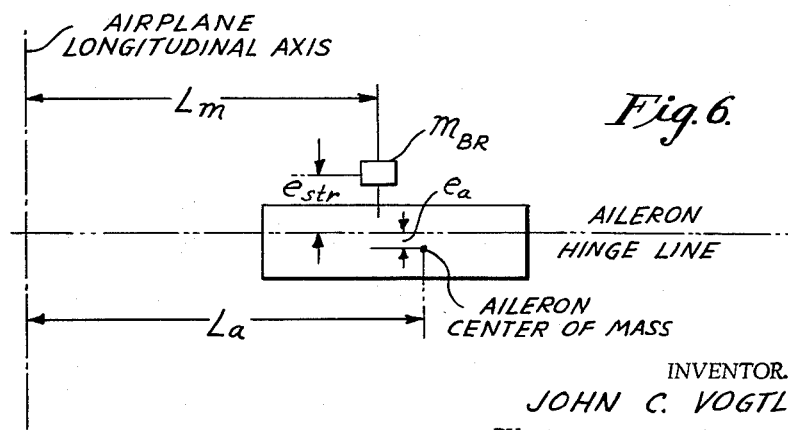
FIG. 6 is a diagram of an aileron and its weight relating it to the longitudinal axis of the airplane.

In illustration of the foregoing, referring to FIG. 6, dynamic balance of one aileron is achieved when the product of the aileron mass, the distance $L_a$ from the aileron center of mass to the longitudinal axis of the airplane, and the distance $e_a$ from the aileron center of mass to the hinge line equals the product of the weight $m_{BR}$ added for dynamic balance, the distance $L_m$ to the airplane longitudinal axis, and the distance $e_{str}$ to the aileron hinge line. Thus the lateral position of the weight $m_{BR}$ is important since it enters into the feature of dynamic balance.

The weight for stability $m_{SR}$ is calculated in accordance with my basic equation heretofore described but modified, as follows, $$\frac{\ddot{\alpha}_c}{\ddot{\alpha}_a} = \frac{e_{st1} m_{SR} e_{str}}{I_R}$$

where $\ddot{\alpha}_c$=the angular acceleration of the ailerons,
$\ddot{\alpha}_a$=the angular rolling acceleration of the airplane,
$m_{SR}$=the weight to be added to each aileron for roll stability,
$I_R$=the effective mass moment of inertia of all the moving parts of the control system including the weights $m_{BR}$ required for dynamic balance (but not including the weights $m_{SR}$ needed for stabilization) taken about the aileron pivotal axis,
$e_{str}$=the moment arm for the weight $m_{SR}$ about the aileron hinge line, and
$e_{st1}$=the distance between the two weights $m_{SR}$ (one to be added to each aileron).

However, I have discovered that in the aileron control system the ratio of the acceleration of the ailerons to the acceleration of the airplane should be greater than zero, 1.25 being a convenient value. Also, as a matter of convenience the two weights $m_{BR}$ and $m_{SR}$ are placed at the same location so that in the above equation $e_{st1}$ is twice $L_a$ and the moment arms are the same.

I have found that the initial dynamic balance of the ailerons as hereindescribed is important. For the elevators of a small airplane it is sufficient to merely statically balance them, as previously described. In larger air planes, however, each elevator should be dynamically balanced and the entire pitch control system thereafter statically balanced by placing a sufficient weight forward of the elevators, for instance, at the control stick as described in connection with FIG. 1, as to statically balance the system.

Figure 3:
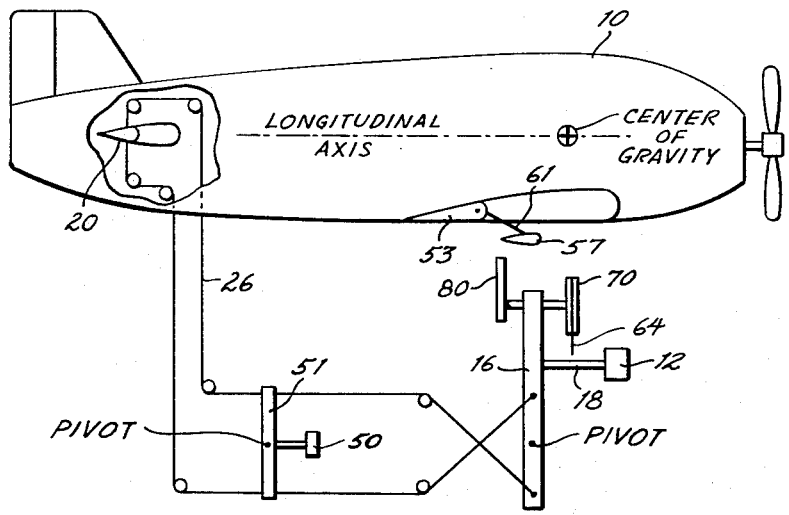
FIG. 3 is a diagrammatic view of a modified elevator control system.

FIG. 3 illustrates a modified embodiment of this invention in which the aft weights are combined into a single weight 50 and placed near the elevators, but it is not directly connected to the elevators as in FIG. 1, and is instead connected by a moment arm to a pivotal support 51 movable about a shaft fixed to the airplane. The weight support 51 is connected at its opposite ends, on opposite sides of its pivotal axis, to the cables connecting the elevators to the control stick, as illustrated.

In the embodiment of FIG. 3 the weight 50 includes a first part to statically balance the support 51 and a second part, calculated in accordance with the above described basic equation modified for the position of the weights 50 in FIG. 3, to automatically actuate the elevators during pitching motions. The weight 12 in FIG. 3 includes a part which statically balances the control stick 16 and a second part to statically balance the control system.

As in FIG. 1, in FIG. 3, the control stick 16 and, hence, the weight 12, is disposed near the center of gravity of the airplane. As illustrated in FIG. 3 each half of the cable 26 is directly connected to the same corresponding side of the elevators and support 51 and to the opposite side of the control stick 16 relative to the pivotal axes.

In my analysis I have simplified the equations by omitting the deleterious moments due to friction in the system and the possible adverse aerodynamic effects which may exist. To more accurately analyse the system a term $M_D$, which would include all these deleterious effects, should be added to the left-hand side of the equation on page 6, line 25. As a practical matter, by choosing a value for $\ddot{\alpha}_c$ over $\ddot{\alpha}_a$ which is sufficiently large, such deleterious moments are taken into account in my simplified analysis.

Also, in the elevator control system described in connection with FIG. 1, the forward weight 12 was placed sufficiently near the center of gravity of the airplane so as to result in negligible moments therefrom on the control system during pitching of the airplane.

However, if the forward weight is at a substantial distance from the airplane's center of gravity the basic equation is modified as follows $$\frac{\ddot{\alpha}_o}{\ddot{\alpha}_a} = \left(1 - \frac{a}{e_t}\right) \frac{m'_{SE} e_{st} e_t}{I_p}$$

where the terms are as previously defined in connection with the elevator control system except that the new term "$a$" is the horizontal distance between the forward weight and the airplane's center of gravity. If the forward weight is aft of the airplane's center of gravity this distance is considered as positive and if forward it is considered as negative (and then the minus sign in the equation becomes a plus sign).

I further contemplate that it is desirable to maintain any weight attached by a moment arm at a distance to the control surfaces within the airfoil sections of the stabilizers 85 and 86 and wings 87 and 88. Therefore, in a modification of my invention, with the longitudinal axis of the airplane horizontal and the control surfaces positioned horizontally, i.e., so as to form smooth continuations of the stabilizers or wings, the weights are placed on horizontal moment arms and as far forward as is convenient so as to move within the airfoil sections of the stabilizers 85 and 86 and wings 87 and 88. Also, in certain airplanes, it will be possible to statically or dynamically balance the control surfaces by attaching suitable weights directly to them and in such cases the weight which will be connected by a moment arm to the control surfaces will be only the part needed for automatic stability, i.e., $m_{SE}$ for the elevators and $m_{SR}$ for the ailerons.

I recognize also that the weights 14 and 15 at the elevators could be combined into a single weight attached to the elevators but in such case it should be disposed along the longitudinal axis of the airplane and connected to the elevators by a moment arm of suitable configuration.

The principles described hereinbefore are equally applicable to the control of the rudder 90 but the rudder control system has not been described. The rudder control system may be similar to the elevator control system or the rudder may be connected by suitable cables to the aileron control system so that when automatic movement of the ailerons takes place, corrective automatic movement of the rudder will also take place.

In the arrangements heretofore described I have provided systems in which vertical accelerations in translational flight will not actuate the systems and the systems will be responsive to angular acceleration motion of the airplane only. However, due to the fact that the weights are spaced at small distances (if any) vertically above or below the pivotal axes about which they rotate, the forces imposed upon the systems due to horizontal accelerations in translational flight are negligible.

Thus, I have provided systems wherein weights automatically sense undesired angular accelerations of the airplane and simultaneously actuate the control surfaces of the airplane to correct such undesired motions of the airplane.

In those appended claims in which the control surfaces and/or the control member are first recited as being statically balanced and thereafter a weight is recited as attached thereto, as is done in claim 3 in connection with the elevators, the weight referred to is the weight for stability $m_{SE}$ and the second weight is a weight producing on the cables a counterbalancing moment.

What I claim is:

1. A control system for an airplane to stabilize the airplane about the lateral axis comprising elevators, a control member for actuating said elevators, a cable interconnecting said elevators and control member, each elevator being statically balanced about its pivotal axis, said control member being statically balanced about its pivotal axis, a first weight attached to said elevators forward of the elevator's pivotal axis, a second balancing weight attached to said control member forward of its pivotal axis and positioned relative to said first weight so as to maintain the static balance of the control system when the longitudinal axis of the airplane is substantially horizontal, said weights making the control surfaces nose heavy about their pivotal axes, said second weight being disposed near the center of gravity of the airplane so that during rotational acceleration of the airplane the second weight imposes negligible moments on the control system, and said first weight during rotational acceleration motion of the airplane imposing a moment on the control system which turns the elevators to a position where a restoring moment is placed on the airplane for returning the airplane toward the stable attitude.

2. A control system for stabilizing pitching motions of an airplane comprising the combination of balanced elevators, a balanced control member for actuating said elevators, cables connecting said elevators and control member, first and second angularly movable weights automatically actuating said control system upon pitching rotational acceleration motions of said airplane to automatically tend to stabilize said airplane, said weights being spaced from each other, a first moment arm connecting said first weight directly to the elevators, a second moment arm for said second weight to pivotally mount and operatively connect said second weight to said cables, the moment arms and masses of said weights being sufficient for pitching rotational acceleration motions of said airplane to produce a net force on the elevators in the direction to automatically pivot the elevators to a position where a restoring moment is imposed on the airplane to return the airplane toward the stable attitude, said second weight balancing the static moment imposed by the first weight on the control system when the longitudinal axis of the airplane is substantially horizontal, the control system not being automatically actuated by vertical translational movement of the airplane but being automatically actuated by said pitching rotational acceleration motions.

3. A control system for stabilizing pitching motions of an airplane comprising the combination of elevators each pivotal about an axis, a control member for actuating said elevators, cables connecting said elevators and control member, first and second angularly movable weights automatically actuating said control system upon pitching rotational acceleration motions of said airplane to automatically stabilize said airplane, said weights being spaced from each other, a first moment arm connecting said first weight directly to the elevators, said first weight making the elevators unbalanced with the heavier portion thereof forward of the elevator's pivotal axis, a second moment arm for said second weight to pivotally mount and connect said second weight to said cables, the moment arms and masses of said weights being sufficient for pitching rotational acceleration motions of said airplane to produce a net force on the elevators in the direction to automatically pivot the elevators to a position where a restoring moment is imposed on the airplane to return the airplane to the stable attitude, said weights and moment arms being such that the static moment imposed by said first weight on the control system is balanced by the static moment imposed by the second weight on the control system when the longitudinal axis of the airplane is substantially horizontal so that during translational flight at the substantially horizontal attitude the control system is not automatically actuated by vertical translational movement of the airplane but is automatically actuated by said pitching rotational acceleration motions which are simultaneously sensed, the weights being arranged relative to each other on moment arms to product a net moment due to gravity on the control system in a direction to always turn the control surface to a position where the elevator will produce a force which will produce a moment on the airplane to restore the airplane toward its stable attitude when the airplane is pitching.

4. The structure recited in claim 3 wherein the second weight is disposed sufficiently near the center of gravity of the airplane to produce negligible moments on the control system during pitching rotational acceleration motions of said airplane, and wherein each weight includes a portion calculated on the basis that the ratio of the rotational acceleration of the elevators while moving in the direction to return the airplane toward the initial stable attitude over the rotational acceleration of the airplane during pitching is greater than one.

5. The structure recited in claim 3 wherein the weights are added to elevators that are dynamically balanced, said first weight being positioned above the elevators' pivotal axes and forward thereof, said first weight including a portion making said elevators nose heavy about their pivotal axes, the portion of said first weight making said elevators nose heavy being calculated on the basis that the ratio of the rotational acceleration of the elevators while moving in the direction to return the airplane toward the initial stable attitude over the rotational acceleration of the airplane during pitching is greater than one.

6. The structure recited in claim 2 wherein the moment arms of the weights are such as to always produce a net moment due to gravity forces on the weights tending to turn the elevators in the direction to stabilize the airplane, said first weight being positioned above the elevators' pivotal axes and forward thereof, said first weight including a portion making said elevators nose heavy about their pivotal axes, the portion of said first weight making said elevators nose heavy being calculated on the basis that the ratio of the elevators while moving in the direction to return the airplane toward the initial stable attitude over the rotational acceleration of the airplane during pitching is greater than one.

7. A control system for stabilizing rolling motions of an airplane comprising the combination of ailerons each pivotal about an axis, a control member for actuating said airlerons, cables connecting said ailerons and said control member, first and second angularly movable weights automatically actuating said control system upon rolling motions of said airplane to automatically stabilize said airplane, said weights being equi-spaced from each other, a first moment arm connecting said first weight directly to one aileron, a second moment arm for said second weight to connect said second weight directly to the other aileron, the moment arms and masses of said weights being sufficient for rolling motions of said airplane to produce a force on the ailerons in the direction to automatically pivot the ailerons to positions where a restoring moment is imposed on the airplane to return the airplane toward the stable attitude, said weights and moment arms being such that the static moment imposed by one weight on the control system is balanced by the static moment imposed by the other weight on the control system when the lateral axis of the airplane through its center of gravity is substantially horizontal, the control system not being automatically actuated by vertical translational movement of the airplane but being automatically actuated by said rolling motions.

8. The structure recited in claim 7 wherein the two weights are added to ailerons that are dynamically balanced, said weights being disposed forward of the ailerons' pivotal axes, the size of each weight being calculated on the basis that the ratio of the rotational acceleration of the ailerons over the rotational acceleration of the airplane is greater than zero.

9. A control system for stabilizing rolling motions of an airplane comprising the combination of ailerons each pivotal about an axis, a control member for actuating said ailerons, cables connecting said ailerons and said control member, first and second angularly movable weights automatically actuating said control system upon rolling motions of said airplane to automatically stabilize said airplane, said weights being equi-spaced from each other, a first moment arm connecting said first weight directly to one aileron, a second moment arm for said second weight to connect said second weight directly to the other aileron, the moment arms and masses of said weights being sufficient for rolling motions of said airplane to produce a force on the ailerons in the direction to automatically pivot the ailerons to positions where a restoring moment is imposed on the airplane to return the airplane toward the stable attitude, said weights and moment arms being such that the static moment imposed by one weight on the control system is balanced by the static moment imposed by the other weight on the control system when the lateral axis of the airplane through its center of gravity is substantially horizontal, the control system not being automatically actuated by vertical translational movement of the airplane but being automatically actuated by said rolling motions, and an inertia wheel added to the system to increase the moment of inertia of the roll control system.

10. A control system for stabilizing rolling motions of an airplane comprising the combination of ailerons each pivotal about an axis, a control member for actuating said ailerons, cables connecting said ailerons and said control member, first and second angularly movable weights automatically actuating said control system upon rolling motions of said airplane to automatically return said airplane toward stability, said weights being equi-spaced from each other, a first moment arm connecting said first weight directly to one aileron, a second moment arm for said second weight to connect said second weight directly to the other aileron, the moment arms and masses of said weights being sufficient for rolling motions of said airplane to produce a force on the ailerons in the direction to automatically pivot the ailerons to positions where a restoring moment is imposed on the airplane to return the airplane toward the stable attitude, said weights each comprising a first part to balance each aileron and a second part to actuate each aileron to return said airplane toward the initial stable attitude, the control system not being automatically actuated by vertical translational movement of the airplane but being automatically actuated by said rolling motions, and wherein the size of the second part of each weight is such that the rate at which the ailerons accelerate to move the ailerons in the direction to return the airplane toward the initial stable attitude over the rate at which the airplane accelerates during rolling motion is greater than zero.

References Cited by the Examiner

UNITED STATES PATENTS

| 2,797,882 | 7/1957 | Servanty | 244—76 |
| 2,859,925 | 11/1958 | Gerin | 244—75 |
| 3,002,714 | 10/1961 | Decker | 244—83 |

FOREIGN PATENTS

| 479,981 | 1/1952 | Canada. |

FERGUS S. MIDDLETON, *Primary Examiner.*

ANDREW H. FARRELL, MILTON BUCHLER,
*Examiners.*